United States Patent [19]

Vogt et al.

[11] Patent Number: 5,442,709
[45] Date of Patent: Aug. 15, 1995

[54] CIRCUIT FOR DECODING A MULTIPLEX SIGNAL IN A STEREO RECEIVER

[75] Inventors: Lothar Vogt, Hohenhameln; Jürgen Kässer, Diekholzen; Djahanvar Chahabadi, Hildesheim, all of Germany

[73] Assignee: Blaupunkt-Werke GmbH, Hildesheim, Germany

[21] Appl. No.: 192,505

[22] Filed: Feb. 3, 1994

[30] Foreign Application Priority Data

Feb. 5, 1993 [DE] Germany .................. 43 03 387.3

[51] Int. Cl.$^6$ ............................................. H04H 5/00
[52] U.S. Cl. ................................................ 381/4; 381/7
[58] Field of Search ................... 381/7, 4, 3, 13; 331/20, 25; 375/80-105; 329/304-309

[56] References Cited

U.S. PATENT DOCUMENTS

| | | | |
|---|---|---|---|
| 4,630,299 | 12/1986 | Welles et al. | 381/4 |
| 4,694,495 | 9/1987 | Schroeer | 381/15 |
| 4,827,515 | 5/1989 | Reich | 381/7 |
| 4,893,341 | 1/1990 | Gehring | 381/7 |
| 5,257,312 | 10/1993 | Therssen et al. | 381/4 |

*Primary Examiner*—Curtis Kuntz
*Assistant Examiner*—Minsun Oh
*Attorney, Agent, or Firm*—Frishauf, Holtz, Goodman & Woodward

[57] ABSTRACT

In a circuit for decoding a multiplex signal in a stereo receiver, where the multiplex signal contains a composite signal (L+R) in the base band, a subcarrier modulated with a difference signal (L−R), and a pilot signal with half the frequency of the subcarrier, the multiplex signal in digital form is multiplied (2, 3) by a reference carrier generated with a sampling clock signal (14) produced in the radio receiver, where the reference carrier is present in two phase positions shifted 90° with respect to each other. The mix or product signals resulting from this multiplication are multiplied (4, 5) by one correction signal each, thus forming corrected mix signals. The corrected mix signals are added (6) and supplied to a matrix circuit (8, 9), together with the composite signal, to create respective stereo audio channel signals (L, R).

12 Claims, 3 Drawing Sheets

CIRCUIT FOR DECODING A MULTIPLEX SIGNAL IN A STEREO RECEIVER

Cross-reference to related applications, assigned to the assignee of the present invention, the disclosures of which are incorporated by reference:

U.S. Ser. No. 08/164,127 Bartels, Kässer & Chahabadi, filed Dec. 8, 1993 (Attorney. Docket 930710-MO, assignee docket R. 2210).

German patent application P 43 09 518.6 filed Mar. 24, 1993 by Kässer & Herrmann and corresponding U.S. Ser. No. 08/215,186, filed Mar. 21, 1994 (Attorney. Docket 930863-MO, assignee docket R. 2223).

FIELD OF THE INVENTION

The invention relates generally to a circuit design for decoding a multiplex signal in a stereo receiver, in which the multiplex signal contains a composite signal (L+R) in the base band, a subcarrier modulated with a difference signal (L−R), and a pilot signal with half the frequency of the subcarrier.

BACKGROUND

For decoding the multiplex signal, on the one hand, to demodulate the difference signal having the frequency of the subcarrier, and on the other hand to matrix, with the composite signal, the difference signal created in this manner. The pilot signal contained in the multiplex signal—often referred to as pilot tone—enables regeneration of the subcarrier, thereby allowing the use of a synchronous demodulator or a switched demodulator for demodulation of the difference signal with the frequency of the subcarrier. In analog circuit technology, various circuits have been known to accomplish this.

THE INVENTION

It is the object of this invention to advantageously facilitate decoding of a multiplex signal, preferably available in digital form, by means of digital circuit technology.

The circuit according to the invention, features multiplication of the multiplex signal in digital form by a sampling clock reference carrier generated with a sampling clock signal produced in the radio receiver where the reference signal is present in two phase positions shifted 90° with respect to each other. The "mix" (product) signals created by the aforesaid multiplication are then multiplied by a correction signal, thus creating corrected mix signals. The corrected mix signals are added and supplied together with the composite signal to a matrix circuit for the formation of stereo audio signals (L, R).

A significant advantage of the circuit design, subject to the invention, is that the reference carrier is locked to a created for digital processing. This enables significant simplifications in designing the digital circuitry, for instance, the possibility to read out the sampling values of the reference carrier from a stored table.

Another advantage of the circuit according to the invention, is that regeneration of the reference carrier from the pilot signal is not necessary. This is usually associated with significant expense and problems regarding transient behavior. With the circuit according to the invention, a reference signal is available immediately after the unit is turned on or after a station change. Demodulation of the difference signal therefore occurs immediately. However, demodulation may not be optimally corrected during a transient or "pull-in" phase of the correction circuit.

In an alternate embodiment of the circuit according to the invention, it is provided that the multiplex signal is multiplied by a reference pilot signal that is phase-locked with a reference carrier, where the reference pilot signal is present in two phase positions with a phase angle of 90°; that the created additional mix signals are low-pass filtered; and, that the low-pass filtered additional mix signals are squared and subtracted from one another to form a first correction signal, and multiplied by each other and by two to form a second correction signal.

According to an advantageous embodiment of this circuit, it can also be provided that low-pass filtered additional mix signals are squared and added to form a signal representing the amplitude of the pilot signal. This enables the correction signals to be controlled for normalization of their amplitude by a signal representing the amplitude of the pilot signal.

The Signal representing the amplitude of the pilot signal can also be evaluated in other ways, for instance to recognize the reception quality.

Another feature of the invention is that for creating the correction signal, one filter each is provided whose bandwidth can be controlled such that after changing the received station the bandwidth will first be broad, then narrowed, and that the filters are also used for normalization of the amplitude of the correction signals. This allows quick detection of the stereo reception and quick correction of the mix signal after a station change, while during stationary operation the narrow bandwidth contributes to noise reduction.

The expense for deriving the correction signals can be lowered by reducing the scanning rate after low-pass filtering of the additional mix or product signals.

DRAWINGS

Further features of the preferred embodiment will be apparent from the drawings, of which:

The same components are labeled with the same references in each drawing. The exemplary embodiment of the invention and parts thereof are shown as block diagrams. However, this does not imply that the circuit of the invention is limited to implementation through the conformity of individual blocks to their corresponding circuits. Rather, the circuit of the invention can be implemented in a particularly advantageous manner using highly integrated circuits. It is possible to employ digital signal processors, which, if programmed accordingly, can perform the processing steps depicted in the block diagrams. The circuit of the invention can form significant portions of a radio receiver, when combined with other circuit elements, as part of an integrated circuit.

DETAILED DESCRIPTION

Figure 1:
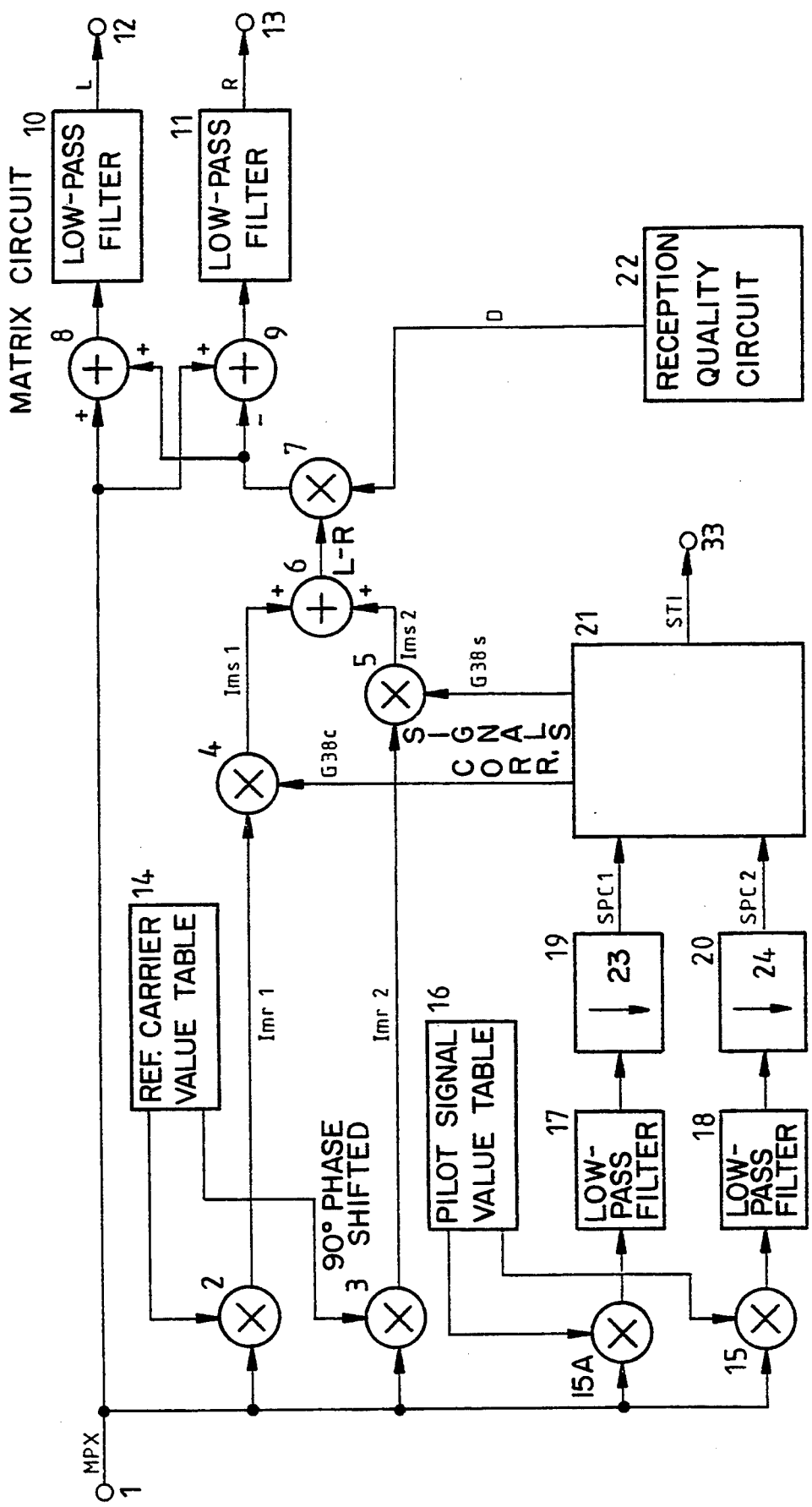
FIG. 1 is a block diagram of the circuit design subject to the invention.

A multiplex signal MPX that contains, in a generally known manner a composite signal L+R, a subcarrier modulated with a difference signal L−R, and a pilot signal, is supplied to the stereo decoder according to FIG. 1 via an input 1. For this well-established VHF/FM stereo broadcasting, the frequency of the subcarrier is 38 kHz, while the pilot signal has a frequency of 19 kHz. The angular frequency of the pilot signal is hereafter designated as $w_p$.

For the stereo decoder according to FIG. 1, multipliers 2, 3, 4, 5 and an adder 6, are provided for demodulation of the signal with the carrier frequency. From the output of the adder 6, the demodulated difference signal L−R, together with the multiplex signal, is supplied via an additional multiplier 7 to a matrix circuit consisting of two additional adders 8, 9. The decoded digital stereo audio signals L and R arrive at respective outputs 12, 13 via respective low-pass filters 10, 11 which each have a limit frequency of about 15 kHz.

With the help of two multipliers 2, 3, the multiplex signal is first multiplied by a 38 kHz reference carrier. The multiplication at 3 is carried out with a reference carrier that has a 90° phase angle in relation to the one for the multiplication at 2. Multiplier 2 uses a 38 kHz sine signal which trails by 90° the 38 kHz cosine signal used by multiplier 3. The sampling values of the reference carrier are read from a table 14. The frequency of the reference carrier (e.g. 38 kHz) is an integer fraction (e.g. 1/6) of the sampling frequency (e.g. 228 kHz), which is based on the multiplex signal. The sampling frequency $f_A$ is created in a generally known manner in the radio receiver.

At an advantageous sampling frequency of 228 kHz, six sample values per period T of the reference carrier are derived. The sample values of the multiplex signal MPX are derived from $MPX_n := MPX(n*T)$, where n, as in the case of the quantities below, is an integer and T is the reciprocal of sampling frequency $f_A$. The number of individual sample values is n.

The multiplex signal has the following format:

$$MPX_n = (L_n + R_n) + (L_n - R_n) * \sin(2w_p n*T + 2\alpha) + \sqrt{A} * \sin(w_p n*T + \alpha).$$

The following respective mix (product) signals are derived by multiplication by the values $\sin(2w_p t)$ or $\cos(2w_p t)$ of the reference carrier retrieved from table 14:

$$Imr1 = MPX_n * \sin(2w_p nT) = \tfrac{1}{2}(L_n - R_n) * \cos 2\alpha + \ldots \quad \text{or} \quad (1)$$

$$Imr2 = MPX_n * \sin(2w_p nT) = \tfrac{1}{2}(L_n - R_n) * \sin 2\alpha + \ldots \quad (2)$$

where $\alpha$ is the phase difference between the pilot signal received and a reference pilot signal created within the receiver from the sampling clock signal. Components with higher frequencies are not illustrated in equations (1) and (2), since they are filtered out later by low-pass filters 10, 11.

Signals Imr1 and Imr2 are supplied to additional multipliers 4, 5, whose output signals—hereafter called additional mix signals—can be described in the following manner:

$$Ims1 = Imr1 * G38c = \tfrac{1}{2}(L_n - R_n) * \cos 2\alpha * G38c_n$$

$$Ims2 = Imr2 * G38s = \tfrac{1}{2}(L_n - R_n) * \sin 2\alpha * G38s_n.$$

As will be described later, signals $G38s = \sin 2\alpha$ and $G38c = \cos 2\alpha$. Therefore, the additional mixed signals are:

$$Ims1 = \tfrac{1}{2}(L_n - R_n) * \cos 2\alpha * \cos 2\alpha$$

$$Ims2 = \tfrac{1}{2}(L_n - R_n) * \sin 2\alpha * \sin 2\alpha$$

Therefore, the output signal of the adder 6 is $\tfrac{1}{2}(L_n - R_n)$. Through suitable normalization with a supplied value $D = 2$ with the aid of multiplier 7, $(L_n - R_n)$ results. D can also be used to fade the channel separation smoothly from monophonic to stereo reception. For monophonic operation, $D = 0$.

The subsequent matrix circuit from adders 8, 9, as well as the low pass filters 10, 11, then create the digital output signals L and R. The low-pass filters can be advantageously designed such that, in addition to suppressing the frequencies above the wanted signal, they carry out a de-emphasis.

Below, with reference to FIG. 1, generation of the correction signals G38c and G38s supplied to multipliers 4 and 5 is explained. For this purpose, the multiplex signal MPX is first multiplied with two reference pilot signals $\sin(w_p t)$ and $\cos(w_p t)$ having a 90° phase angle with respect to one another. These reference pilot signals are read out of a table 16. Multiplier 15A obtains, from table 16, a 19 kHz sine signal which trails by 90° the 19 kHz cosine signal used by multiplier 15. The output signals of multipliers 15A, 15 pass through low-pass filters 17, 18, whose limit frequency is about 70 Hz, which yields signals $$SPC1_n = \sqrt{A} * \cos \alpha \text{ and } SPC2_n = \sqrt{A} * \sin \alpha.$$

Figure 2:
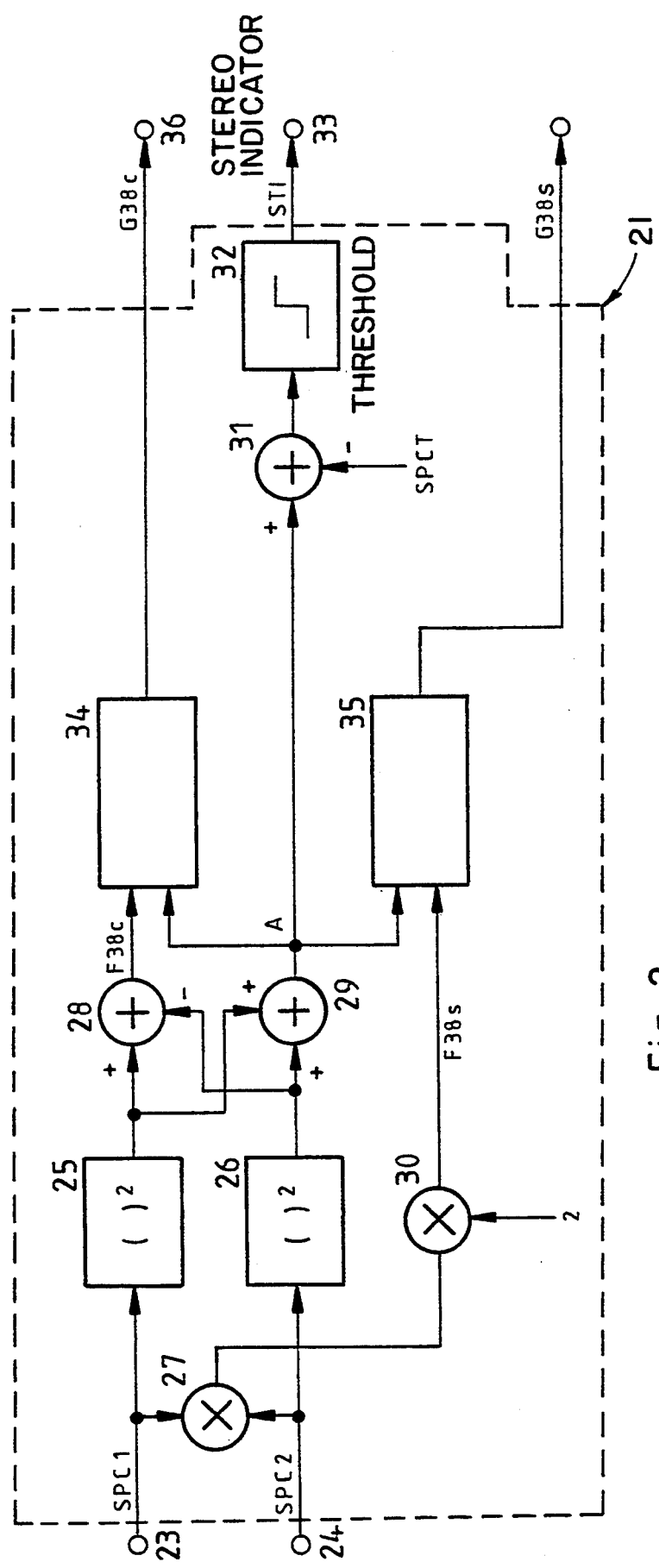
FIG. 2 is a block diagram of a portion of a circuit design for deriving the correction signals that is only schematically depicted in FIG. 1.

Because the frequency of these signals is much lower in comparison to the pilot signal, the sampling rate is reduced at 19, 20, which saves significant expense in the network 21. The output signals of these circuits is supplied to the network 21, which is used to derive the correction signals G38s and G38c. Network 21 is described below in greater detail, with reference to FIG. 2.

Signals SPC1 and SPC2 supplied via inputs 23, 24 are each squared at 25, 26 and multiplied by each other at 27. The squared signals SPC1 and SPC2 are subtracted from each other at 28 and added together at 29. The product of the two signals is multiplied by "2" at 30. All together, the following signals are created:

$$A = (SPC1)^2 + (SPC2)^2$$

$$F38c = (SPC1)^2 - (SPC2)^2 = A * \cos 2\alpha$$

$$F38s = 2*(SPC1 * SPC2) = A * \sin 2\alpha$$

Quality or parameter A represents the amplitude of the received pilot signal. It is transformed into a switching signal STI with a subtractor 31 and a threshold circuit 32. Signal STI can be picked up at an output 33 and used to indicate stereo reception.

Signals F38c and F38s are separated from "Component A" using filters 34, 35 which are supplied with signal A as well. Their limit frequency is about 160 Hz. This eliminates the influence of fluctuations of the pilot signal amplitude on stereo decoding. Signals G38c and G38s, free of the "A" component, can be picked up at outputs 36, 37 and supplied to multipliers 4, 5 (FIG. 1).

Figure 3:
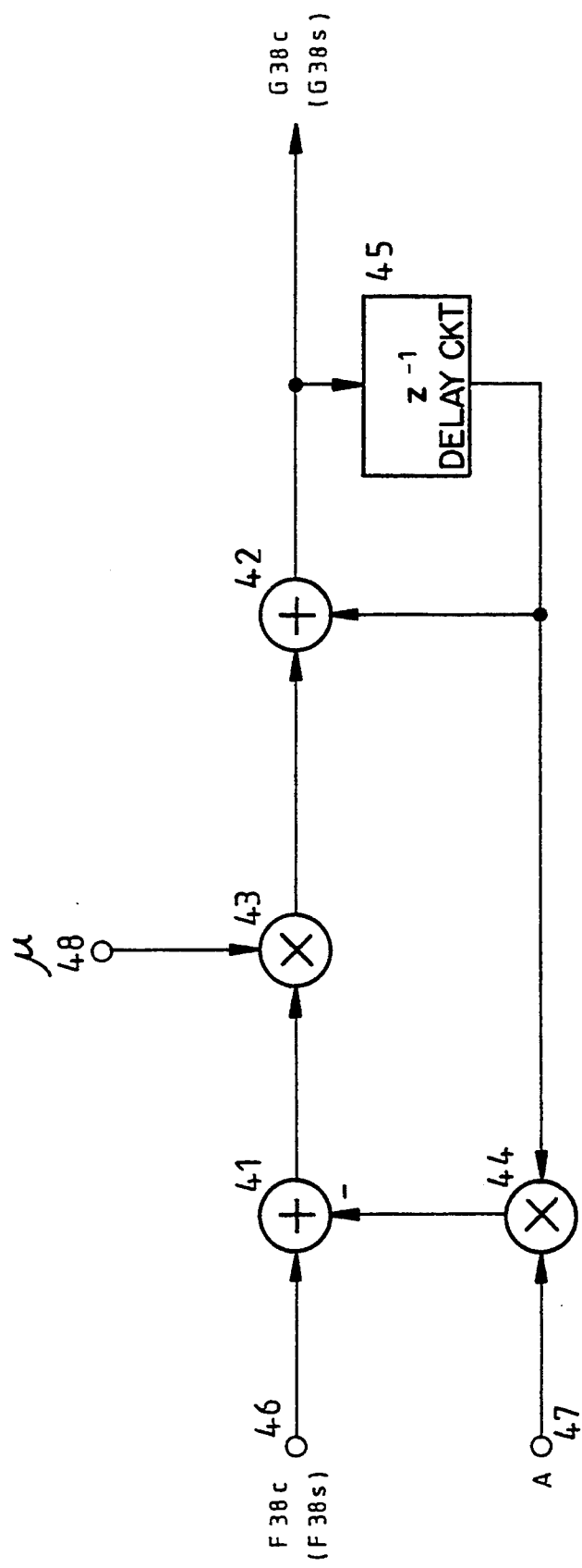
FIG. 3 is a block diagram of a filter used in the circuit design according to FIG. 2.

FIG. 3 illustrates an embodiment of filters 34, 35. It consists of two adders 41, 42, two multipliers 43, 44, and a delay element 45. Inputs 46, 47, 48 are supplied with signals F38c and A, as well as a real number (gradient coefficient) $\mu$ with which the step width can be controlled. The signal at the output 49 of the filter according to FIG. 3 is derived from $$G38c_n = G38c_{n-1} + \mu(F38c_n - A^*G38c_{n-1}), \text{ and}$$

$$G38s_n = G38s_{n-1} + \mu(F38s_n - A^*G38s_{n-1}).$$

After a transient or pull-in period, $G38c_n = \cos 2\alpha$; for filter 35 (FIG. 2), $G38s_n = \sin 2\alpha$. $\mu$ can be preset by a processor as a fixed number, preferably 0.1. On the other hand, it is also possible to vary $\mu$, and with it the transient period, for instance to accomplish a short transient period for a broad bandwidth of the filter immediately after changing a station; thereafter the bandwidth is narrowed to achieve a better S/N-ratio. Parameter $\mu$ thus specifies the limit frequencies of filters 34–35.

FIG. 1 also shows a circuit 22, which supplies a signal D representing the reception quality. Theoretically, D=1 at maximum channel separation; in practice, it may be slightly more since the decoder input lead doesn't offer a constant transfer function. This signal can be derived in a generally known manner or, as described above, from signal A. It can also be derived as disclosed in German patent application P 43 09 518.6 of Mar. 24, 1993 by Kässer & Herrmann and corresponding U.S. Ser. No. 08/215,186 filed Mar. 21, 1994 (Attorney docket 930863-MO, assignee docket R. 2223). The output signal D of circuit 22 is fed to multiplier 7, enabling a smooth transition between stereo and mono reception.

Various changes and modifications are possible within the scope of the inventive concept. Although the circuit has been illustrated as discrete components, many of the functional stages shown could be implemented by suitable programming of a digital signal processor e.g. model 320C50 from Texas Instruments or 56001 from Motorola.

We claim:

1. A digital stereo decoding circuit for processing a received multiplex stereo signal having a sum or composite signal (L+R) in a base band thereof, a subcarrier modulated with a difference signal (L−R), and a pilot signal whose frequency is half of the frequency of said sub-carrier, comprising
    means (14) for generating, using a local sampling clock signal, first and second reference carrier signals which are phase-shifted 90° with respect to each other,
    respective means (2,3) for digitally multiplying said multiplex signal by each of said first and second reference signals, thereby producing first and second uncorrected mix or product signals (Imr1, Imr2);
    means (17–21) for generating first and second correction signals (G38c, G38s);
    respective means (4,5) for digitally multiplying said first correction signal by said first uncorrected mix signal (Imr1) to produce a first corrected mix signal (Ims1) and said second correction signal by said second uncorrected mix signal (Imr2) to produce a second corrected mix signal (Ims2);
    an adder (6) adding together said first and second corrected mix signals (Ims1, Ims2) to produce an adder output signal, and
    a matrix circuit (8, 9, 10, 11) which receives said adder output signal and said sum or composite signal (MPX) and generates, at respective audio outputs (12, 13), a stereo left-channel signal and a stereo right-channel signal.

2. A circuit according to claim 1, wherein (FIG. 2) said means for generating first and second correction signals (G38c, G38s) comprises
    means (16) for generating from said pilot signal, which is coupled in phase to said reference carrier, first and second pilot reference signals having phase positions 90° shifted with respect to each other,
    respective means (15A, 15) for digitally multiplying said multiplex signal by each of said first and second pilot reference signals,
    respective first and second low-pass filters (17, 18) coupled to outputs of said multiplying means,
    means for squaring (25) an output signal from said first low-pass filter (17) and subtracting (28) therefrom a square (26) of an output signal of said second low-pass filter (18) to produce said first correction signal (G28c) and means (27, 30) for multiplying together said output signals of said first and second low-pass filters (17, 18) and for doubling the result, thereby producing said second correction signal (G38s).

3. A circuit according to claim 2, further comprising means (29) for adding said squared output signals of said low-pass filters (17, 18) to derive a parameter indicative of an amplitude of said pilot signal.

4. A circuit according to claim 3, further comprising means, responsive to said pilot signal amplitude (A) for normalizing amplitude of said first and second correction signals (G38c; G38s).

5. A circuit according to claim 4, further comprising first (34) and second (35) variable-bandwidth filters which, responsive to a station change, enter an initial wide-bandwidth mode and, after a predetermined lapse of time, revert to a narrow-bandwidth mode.

6. A circuit according to claim 2, further comprising (FIG. 3)
    means responsive to said output signals of said low-pass filters (17, 18) for reducing a sampling rate.

7. A circuit according to claim 3, further comprising means (31, 32) for comparing said amplitude (A) of said pilot signal to a threshold value to generate an indication (STI) of whether stereo reception is occurring.

8. A circuit according to claim 1, wherein the multiplication by the reference carrier and by the reference pilot signal is carried out by multiplying with values read out of a table.

9. A circuit according to claim 2, wherein the sum of the corrected mix signals is supplied to a matrix circuit via a multiplier (7), and the multiplier is controlled by a circuit (22) which indicates the quality of the reception signal.

10. A circuit according to claim 3, wherein furthermore, for purposes of creating the correction signals, a signal is created from the low-pass filtered additional mixed signals by squaring and subtracting from one another, and another signal is created from the low-pass filtered additional mixed signals by multiplying by each other and multiplying by 2, and where each of these signals is then multiplied by the reciprocal of the signal representing the amplitude of the pilot signal; and wherein the results of these multiplications represent the correction signals.

11. A circuit according to claim 3, wherein furthermore, for purposes of generating the correction signals, a first one of said correction signals is created from the low-pass filtered additional mixed signals by squaring and subtracting from one another;

a second one of said correction signals is created from the low-pass filtered additional mixed signals by multiplying by each other and multiplying by 2; and the signal representing the amplitude of the pilot signal is multiplied by the composite signal before it is supplied to the matrix circuit.

12. A circuit according to claim 11, wherein the correction signals and the signal representing the amplitude of the pilot signal pass through low-pass filters (34, 35).

* * * * *